May 9, 1961  B. KARLOVITZ  2,982,991
APPARATUS FOR MAKING FIBERS
Filed Nov. 9, 1956

INVENTOR.
BÉLA KARLOVITZ
BY Oscar L. Spencer
ATTORNEY

May 9, 1961 B. KARLOVITZ 2,982,991
APPARATUS FOR MAKING FIBERS
Filed Nov. 9, 1956 2 Sheets-Sheet 2

*INVENTOR.*
*BÉLA KARLOVITZ*
BY Oscar L. Spencer
*ATTORNEY*

United States Patent Office 2,982,991
Patented May 9, 1961

2,982,991

APPARATUS FOR MAKING FIBERS

Béla Karlovitz, Mount Lebanon, Pa., assignor to Pittsburgh Plate Glass Company, Allegheny County, Pa., a corporation of Pennsylvania Filed Nov. 9, 1956, Ser. No. 621,379
3 Claims. (Cl. 18—2.5)

The present invention relates to an apparatus for fiberizing glass and it has particular relation to an apparatus for making glass fibers which involves subjecting a body of glass to a gaseous blast to attenuate the body into fibers.

It is known that glass fibers can be produced by subjecting a body of glass, such as a solid rod or molten stream of glass, to the attenuating force of a gaseous blast. For example, glass fibers having relatively large diameters can be produced by the action of a blast of steam upon a molten stream of glass. Very fine glass fibers can be produced by the attenuating action of a high temperature, high velocity gaseous blast on a solid rod of glass. The temperature of the blast is high enough to heat the glass to a molten state suitable for attenuation thereof and the velocity of the blast is high enough to pull the molten glass out into very fine fibers of the order of the 5 microns or less in diameter. A high temperature, high velocity blast can be produced by burning a combustible mixture of gases in a combustion chamber and issuing the burned gases through a narrow orifice in the side of the burner such as shown in U.S. Patent No. 2,489,242 or by other means such as will be described in detail hereinafter.

In the attenuation of glass into fibers, the gaseous blast has several interrelated functions. These functions are as follows:

(1) *Temperature.*—A given flame will heat a fixed quantity of glass per unit time. This factor determines the rate of production depending upon whether supplementary heating of the glass is employed.

(2) *Velocity.*—The average velocity of the blast will pull a definite length of fiber per unit time.

(3) *Turbulence.*—The fibers will be further pulled or attenuated by the turbulence of the hot gases as long as the temperature of the blast is sufficiently high to maintain the fiber in an attenuable state.

Experiments and calculations show that the first and third functions set forth above of the gaseous blasts as produced and employed by the prior art have been to a great extent unexploited. The time of attenuation, i.e., the time during which the glass is at a proper temperature for attenuation and is being subjected to a velocity sufficient to attenuate it, is extremely short. Furthermore, the turbulence of the gaseous blast is extremely low in comparison to what it could be.

Turbulence is a major factor in the attenuation of glass by means of a gaseous blast. In turbulent motion, any two points drift apart by their random motion. Turbulence continually increases, in the average, the distance between any two points of the stream; therefore, strong turbulence assists in stretching the fibers. In a turbulent, gaseous blast, the glass fibers are stretched randomly in many directions other than in the general direction of the blast as well as in the general direction of the blast. This permits attenuation of the fibers to lengths many times that of the theoretical straight line elongation caused by the velocity of the blast. For these reasons, it can be seen that a gaseous blast of extremely high turbulence is desired for maximum attenuation.

Turbulence in the high temperature, high velocity, gaseous blasts as proposed and used in the prior art is limited. The theory of the prior art has been that turbulence is an important attenuating force but it is necessary to limit the amount of turbulence present. This was believed necessary to prevent the fibers from being vibrated or whipped to such an extent that they are ejected from the sides of the blast. Ejection of the fibers from the blast causes them to be cooled and prevents their further attenuation. It was also believed that extreme turbulence would break the cooled or fine fibers into lengths shorter than desired. Under these conditions, the status of the art has been such that some turbulence is desired but the amount of turbulence must be controlled.

This theory of the prior art is rejected by the present invention. In accordance with the present invention, the attenuating effect of a gaseous blast can be greatly increased by increasing the turbulence of the blast while the fibers are entrained in the blast and are in an attenuable state. This is accomplished by surrounding the blast and fibers being attenuated by a duct of particular configuration. The blast is enclosed by the duct beginning at least at the point of entry of the glass into the blast and extending downstream thereof for a sufficient length to ensure that the blast and fibers entrained therein are enclosed during the time the fibers are at attenuating temperature.

The effect of the duct is three-fold.

(1) It shields the gaseous blast from the cooling effects of the surrounding atmosphere and thus maintains the blast at or near attenuating temperature for a greater length of time. This extends the effective length of the attenuating zone.

(2) It reduces the energy loss in the blast caused by the acceleration of the ambient cold atmosphere by the gaseous blast and by lateral expansion of the blast before it is desired to take place.

(3) The kinetic energy of the blast may be substantially completely converted into turbulent energy many times greater than hitherto attainable or believed desirable for the production of fibers. Use of the duct enables the turbulence to act upon the fibers while they are at attenuating temperature and prevents premature cooling and breaking of the fibers by the surrounding cold atmosphere.

The third effect above is especially important and is achieved by the present invention wherein the cross sectional area of the blast within the duct is greatly enlarged downstream of the entry of the glass into the blast but at a point where the glass is still at attenuating temperature. As the cross sectional area of the duct and the blast is increased, the velocity of the blast is decreased and the kinetic energy of the blast is substantially completely converted to turbulent energy which assists in attenuating the fibers to a degree many times that attained by the prior art. Furthermore, the fibers as thus attenuated are relatively long fibers which can be easily handled. The fibers are also crinkly of wavy and can be easily matted.

The invention is further described in conjunction with the description of the drawings in which.

Figure 1:
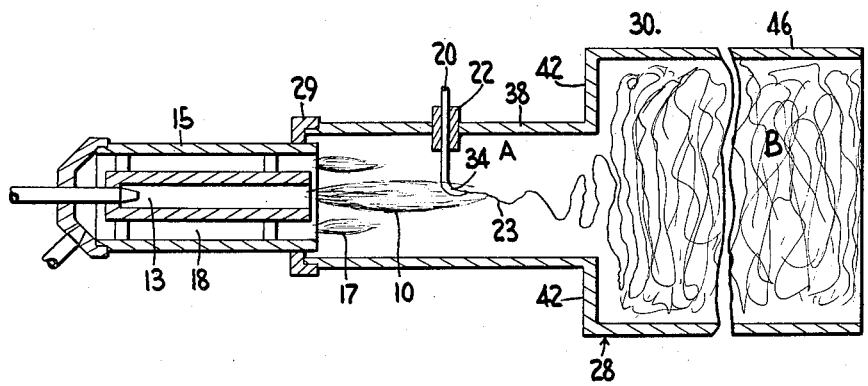
Fig. 1 is an elevation in section diagrammatically illustrating the duct of the present invention.
Figure 6:
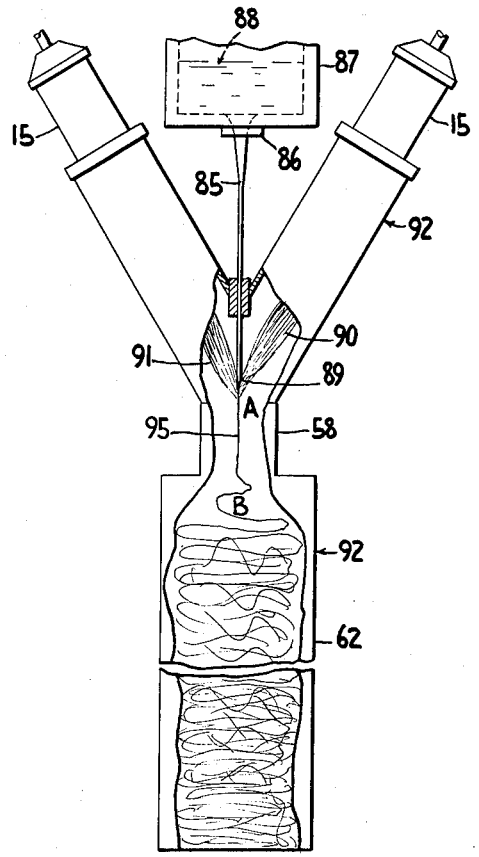
Figure 3:
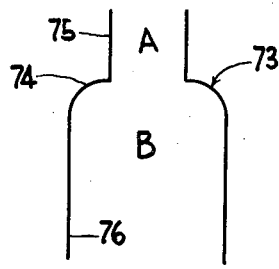
Figure 5:
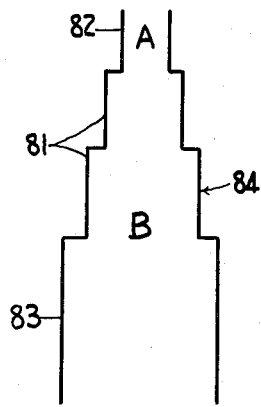
Figure 4:
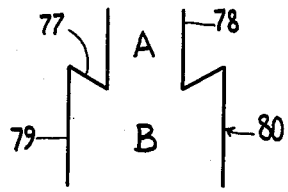

Figs. 3 to 5, inclusive, diagrammatically illustrate configurations of ducts useful in the practice of the invention; and Fig. 6 is an elevation in section diagrammatically illustrating a further embodiment of the invention shown in Fig. 1.

In the drawings, the invention is shown in Fig. 1 in combination with a stabilized, high velocity, high temperature blast 10 produced by the combustion in air of a high velocity combustible mixture issuing from central conduit 13 of burner 15. The high velocity combustion is stabilized by a flame 17 produced by combustion along side of the blast 10 of a low velocity, combustible mixture issuing from annular conduits 18 of the burner 15.

In order to stabilize the main flame 10 and prevent its blowing out, the stabilizing flame 17 must have a strength at least equal to that represented by the equation $$q = \frac{1}{\psi} h U_c$$

where $q$ is the pilot flame strength, $h$ is the excess enthalpy of the combustion wave, $\psi$ is the pilot flame efficiency, and $U_c$ is the critical velocity of the main flame.

The strength of the pilot flame is derived from the theory that an area element of a combustion wave "stretches" without "breaking" only if the characteristic quantity $$\eta \frac{1}{U} \frac{\partial U}{\partial y} \qquad (1)$$

is smaller than a critical value which is of the order of 2 to 3. Here, $\eta$ is the thickness of the combustion wave in the main flame.
$U$ is the local flow velocity.
$y$ is the distance normal to the direction of flow measured from the wall of the burner port.
$\frac{\partial U}{\partial y}$ is the velocity gradient of the flow near the wall.

The value of $\eta$ depends upon the nature of the fuel-oxidant mixture. The values of $U$ and $\partial U/\partial y$ depend upon the velocity profile of the stream. Toward the stream boundary, $U$ decreases to zero and $\partial U/\partial y$ increases to a maximum, so that the characteristic quantity $$\eta \frac{1}{U} \frac{\partial U}{\partial y}$$

attains the critical value for stretching at some distance $y_c$ from the boundary, and is smaller than that value for larger values of $y$ farther inside the stream. Denoting the values of the velocity and of the velocity gradient at $y_c$ by $U_c$ and $g$, respectively, one may thus write the approximate equation $$\eta \frac{1}{U_c} g \simeq 2 \text{ to } 3 \qquad (2)$$

The pilot flame must provide sufficient energy to ignite the stream to the depth $y_c$ from the boundary. This is the case if the condition $$q = \psi h U_c \qquad (3)$$

is fulfilled. Here, $q$ and $\psi$ represent the pilot strength and pilot efficiency, respectively. Since, with increasing flow rate the boundary velocity gradient $g$ increases, $U_c$, as determined by Equation 2, also increases, and the pilot strength $q$ must be made larger according to Equation 3.

If the flow rate and the burner diameter are specified, the value of $g$ can be estimated from available hydraulic equations. For natural gas-air mixtures, $\eta$ is of the order of about one millimeter. From this information, the value of $U_c$ can be estimated by means of Equation 2. The value of $h$ for such mixtures is about $3 \times 10^{-3}$ calories per square centimeter, and the efficiency $\psi$ will usually be of the order of a few percent. Using these values of $U_c$, $h$ and $\eta$, the pilot strength $q$ may be estimated by means of Equation 3.

Stabilized flames as described above have proved to be excellent for attenuating glass into fibers in combination with the duct described herein. These flames are highly turbulent in nature and are an excellent source of greater turbulence which can be developed downstream as a further attenuating force in accordance with the teachings of this invention.

An elongated body in the form of a rod or primary filament of glass 20 is fed by means of guide 22 into the path of the blast 10 at about a 90° angle to the path of the stabilized blast. The heat of the blast 10 heats the glass 20 to its attenuating temperature and the velocity of the blast pulls it out into fine fibers 23.

In accordance with the present invention, a duct 28 is connected to the burner 15 at 29 so as to exclude the surrounding atmosphere 30 and extends therefrom in the line of the blast for a substantial distance. The duct may be formed of metal or refractory material and may be of circular, rectangular or other cross-section. It is designed to prevent substantial lateral expansion of the blast for the initial portion of its length. The duct 28 shields the blast 10 from the surrounding atmosphere 30 and maintains the attenuated glass fiber 23 at its attenuating temperature for a much longer time. Furthermore, as the gaseous blast 10 contacts the sides of the duct 28, the turbulence of the blast is maintained in accordance with the theory of pipe flow turbulence. This turbulence is maintained downstream of the blast within the duct so that it is greater than it would be in the central or main portion of an unconfined gaseous blast and greatly increases the amount of attenuation of the fibers 23 therein.

The duct 28 is composed of two sections. Section A extends from the mouth of the burner past the point of entry 34 of the glass body 20 into the blast. As shown, the walls 38 are parallel so as to provide substantially the same cross sectional area in the duct from the point of entry of the glass body into the blast to a point 40 downstream thereof where the fibers 23 have been attenuated by the velocity of the blast and are still at attenuating temperature so that they may be further attenuated.

At this point, the walls of the duct 28 turn at substantially right angles to the direction of the blast and portions 42 of the walls of the duct extend outwardly to walls 46 which again run parallel to the blast and enclose it and the entrained fibers. Section B of the duct is enclosed by walls 46 and is of considerably greater cross sectional area than section A. The enlargement of the duct from section A to section B may be abrupt or gradual and it is to be understood that the form of the duct illustrated is merely exemplary.

At point 40 in the duct, the gaseous blast 10 is released from its confinement by the walls 38 of the duct and expands rapidly to fill the portion of the duct surrounded by walls 46. This movement of the gases in a direction perpendicular to the main direction of the blast and in random direction thereafter reduces the velocity of the blast and causes the kinetic energy of the blast to be substantially completely converted to turbulent energy. The fibers 23 in the extremely turbulent section B of the duct are stretched while hot in a great many random directions by the increased turbulent motion of the blast. The turbulent motion in section B has a much greater attenuating effect than the original velocity and turbulence of the blast in section A. The fibers 23 move in a serpentine manner in section A due to the inherent turbulence of the blast produced by burner 15, however, the degree of turbulence and rate of attenuation are many times greater in section B of the duct.

The increase in the rate of production of the fibers has been witnessed and proven by actual experiment. The theory of this increase is now dealt with. The maximum effective pulling rate of the blast as shown in Fig. 1 can be calculated from the estimated values of flow in sections A and B, size of sections A and B, intensity and scale of turbulence and the temperature of the blast. A numerical example for the calculation of pulling rates is as follows:

In the example, $A_A$ and $A_B$ are the cross sectional areas of the duct and $U_A$ and $U_B$ are the velocities of the gas in sections A and B, respectively, of the duct. Assume (1) X-sectional area of B is ten times X-sectional area of A.
(2) Average velocity of blast in A equals 200 meters per second.
∴ The average velocity in B equals 20 meters per second.

$$\left(\frac{A_A}{A_B} = \frac{U_B}{U_A}\right)$$

(3) Section B of the duct is insulated and/or heated so that the proper temperature is maintained over its entire length.
(4) The length of section B is one meter.
(5) The scale of turbulence in B is one centimeter.

If the velocity of the main blast is reduced from 200 meters per second to 20 meters per second in passing from section A to section B of the duct, the kinetic energy is nearly all converted to turbulence (this will be correct within a few percent). In this case, $$K.E. \sim \frac{\bar{U}_A^2}{2g} = \frac{u'^2 + v'^2 + w'^2}{2g}$$

where $\bar{U}_A$=average velocity in section A; $u'$, $v'$, $w'$=root mean square turbulent velocity components. Assume $$u'^2 = v'^2 = w'^2$$

then $$\bar{U}_A^2 = 3u'^2$$

$$u' = \frac{\bar{U}_A}{\sqrt{3}} = \frac{200}{1.73} = 115 \text{ meters per second}$$

As stated above, in turbulent motion, any two points drift apart by their random motion. The average relative velocity for any short time interval is equal to intensity of turbulence $u'$, therefore, the specific stretching $$\left(\frac{\Delta l}{l}\right)$$

of a fiber in a softened stated would be equal to $$\frac{u' \Delta t}{l^2}$$

where $l^2$ equals the scale of turbulence; $\Delta t$ equals the time of exposure of the fiber to turbulence while it is attenuable.

In the example, $\Delta t$ is the time the fiber spends in section B.

$$\Delta t = \frac{\text{distance}}{\text{average velocity } (\bar{U}_B)} = \frac{1 \text{ meter}}{20 \text{ meters/sec.}}$$

$$\frac{\Delta l}{l} = \frac{u' \Delta t}{l^2} = \frac{115}{0.01} \times \frac{1}{20}$$

$$\frac{\Delta l}{l} = 575$$

This means a unit length of filament will be stretched by turbulent motion 575 times its original unit length in the above example; the effective pulling rate will be 575 times the length of fiber entering the duct. The maximum effective pulling rate therefore equals 575×200= 115,000 meters/second or 377,000 feet/second. A burner, such as shown in U.S. Patent No. 2,489,242, without a duct as just described has an approximate pulling rate of 8,000 to 10,000 feet per second with the same kind of glass. It can be seen, therefore, that the pulling rate has been increased 37.7

$$\left(\frac{377,000}{10,000}\right)$$

times by utilizing the apparatus as illustrated in Fig. 1.

The dimensions of the duct 28 shown in Fig. 1 may vary but will usually be within certain practical limits. The length of walls 38 should be sufficient to permit the formation of the fibers at attenuating temperature and accelerate them as close to the velocity of the blast as possible. It is also desired that the fibers be reduced in size in section A to a diameter where the increased turbulence in section B can best act upon them to further attenuate them. The walls 38 should not be so long that the glass is permitted to cool below its attenuating temperature within section A.

The walls 46 of section B of the duct extend along the blast for a distance equal at least to that distance at which the fibers are in an attenuable state within the blast. The length of walls 46 may be much greater than this, however, and the walls may even extend to the collecting screen, conveyor or other collecting means (not shown in the drawing).

The ratio of the cross sectional areas of the sections A and B is important. The cross sectional area of section A should be such as to prevent substantial lateral expansion of the blast after its formation and entry of the glass into the blast. The cross sectional area of section B in relation to that of section A should be greater, for example, up to 10 or more times that of section A. Since the portion of the kinetic energy available for generating turbulence will increase as the square of the velocity decreases, it can be seen that increasing the cross sectional area of B to more than 10 times that of section A would accomplish little in increasing turbulence, for a cross sectional area increase of 10 times transforms approximately 99 percent of the kinetic energy of the blast into turbulence.

For optimum results, the temperature of the blast and glass should be maintained at the optimum attenuating temperature of the glass throughout the length of the duct. The optimum temperature for attenuating the glass will vary depending upon the composition of the particular glass being fiberized. If the temperature of the glass is too low, the viscosity is high and it offers excessive resistance to stretching of the fibers. If the temperature of the glass is too high, the viscosity of the glass is too low and it will not maintain a thread or fiber, but will break and the surface tension will cause it to assume a spherical shape.

Figure 2:
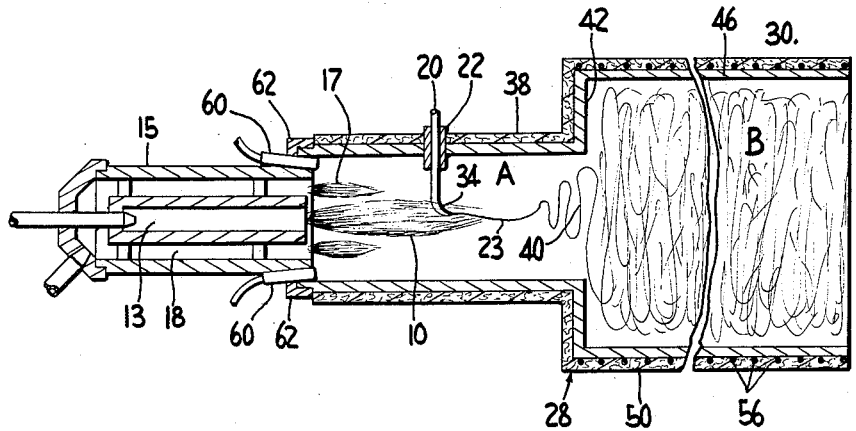
Fig. 2 is an elevation in section diagrammatically illustrating methods of controlling the temperature of the blast in the duct.

Fig. 2 illustrates further embodiments of the apparatus shown in Fig. 1 with provisions being made to control the temperature of the gaseous blast and glass within the duct. These provisions are useful so that the apparatus is flexible enough to be employed with various types of glasses. The temperature of the blast within the duct may be maintained at a relatively high figure by means of insulation 50 around the duct. Heat may be added to the interior of the duct by heating the duct by means of electrical resistance wiring 56 wrapped around the duct or by other suitable heating means. Other heating means contemplated include gaseous blasts entering through walls 46 at an angle to the blast.

If it is found necessary to cool the blast because the temperature is too high within the duct for attenuating a low softening point glass, high velocity turbulent, cool or heated air (for example, up to 400° C.) may be injected into the duct through openings 60 in portions 62 of the duct wall. This air may also be inserted in other portions of section A of the duct. The insertion of the air further increases the turbulence within section B of the duct and is thus a further aid in attenuation.

The duct 28 may have other configurations than that shown in Figs. 1 and 2. For example, in Fig. 3 there is shown a duct 73 wherein the walls 74 corresponding to walls 42 of duct 28 curve outwardly in a quarter-circle from walls 75 to walls 76. In Fig. 4, the walls 77 joining walls 78 and 79 of duct 80 form an obtuse angle with walls 78.

The walls joining the walls of sections A and B of the duct of the present invention may be of such configuration as to gradually increase the area of the duct. This is shown in Fig. 5 wherein the connecting walls 81 are stepped out to connect walls 82 and 83 of the duct 84. This is important if it is desired to maintain a more uniform turbulence level throughout the length of section B of the duct. The overall attenuation may be greater in this case.

In the foregoing examples, the invention has been described with respect to use of a single blast produced by a single burner or a bank of burners such as burner 15. In these figures, the glass is shown as being inserted into the blast in the form of a rod at right angles to the blast. It is to be understood that the entry of the glass into the blast may be made at other angles to the blast and may be made substantially parallel to the blast. It is also to be understood that the glass may be in any form in which the glass can be heated to attenuating temperature and stretched out into fibers. For example, the glass may be in the form of molten streams, flat or corrugated sheets, streams of powdered batch or glass, and other suitable forms. Molten streams may be producted by the action of centrifugal force on a body of molten glass such as shown in U.S. Patents Nos. 2,609,566 and 2,624,912 or by other means.

As an illustration of these other forms of the application of the invention, molten stream of glass 85 is shown in Fig. 6 moving downward by the force of gravity through an orifice 86 in a bushing or glass reservoir 87 containing a pool of molten glass 88. The stream also may be extruded through the orifice 82 by means of pressure exerted on the pool of glass or by the hydrostatic head of the glass, or the stream may be partially cooled and pulled through the orifice by suitable pulling means. The glass 85 moves downwardly into a gaseous blast 89 formed by the combination of two blasts 90 and 91 produced from two burners 15. The blasts 90 and 91 issuing from the burners 15 impinge at approximately a 25° angle and combine to from the single blast 89 traveling downward and pulling glass 85 and attenuating it into many fine fibers.

In this instance, duct 92 extends from the edges of the burners 15 in the form of a Y-shaped duct to the jointure of the blasts and extends downstream parallel to the blast 89 in the manner shown in Fig. 1 with the cross section of the duct increasing from section A to section B thereof. The glass 85 enters the blast at the jointure of the blasts 90 and 91 on a line dividing the included angle between the blasts and is attenuated by the heat and force of the blasts 89, 90 and 91 into a fine fiber 95. The fine fiber 95 is further attenuated in section B by the increased turbulence created in this section as described above. After attenuation, the glass is congealed and gathered into mats or other forms on a suitable conveyor (not shown).

The method for stabilizing flames in high velocity flow by itself and in combination with the effect of turbulence on fiber attenuation are described and claimed in copending application Serial No. 496,438, filed March 24, 1955, by Béla Karlovitz, Bernard Lewis, and Guenther von Elbe, now Patent No. 2,925,620, and which was in turn a continuation in part of their then copending application Serial No. 449,402, filed August 12, 1954, and now abandoned.

Although the present invention has been described with respect to specific details of certain embodiments thereof, it is not intended that such details be construed as limitations on the present invention except insofar as is set forth in the accompanying claims.

I claim:

1. An apparatus for producing glass fibers which comprises means for producing a high temperature, high velocity gaseous blast, means for introducing a body of glass into the blast in a form in which it can be attenuated into fibers by the heat and velocity of the blast, and an enclosing duct for the blast and fibers entrained therein, said duct being connected to the means for producing the gaseous blast so as to exclude the atmosphere from the blast and extending in the direction of the blast for a distance along the blast equal at least to that distance through which the fibers are in an attenuable state in the blast and being of such non-streamlined configuration as to substantially increase the turbulence in the blast at a point spaced a substantial distance downstream from the entry of the glass into the blast where the fibers are in an attenuable state.

2. An apparatus for producing glass fibers which comprises means for producing a high temperature, high velocity gaseous blast, means for introducing a body of glass into the blast in a form in which it can be attenuated into fibers by the heat and velocity of the blast, and an enclosing duct for the blast and fibers entrained therein, said duct being connected to the means for producing the gaseous blast so as to exclude the atmosphere from the blast and extending from the blast means in the direction of the blast for a distance along the blast equal at least to that distance through which the fibers are in an attenuable state in the blast, the cross sectional area of the duct being such that it prevents substantial lateral expansion of the blast along the initial portion of the duct extending from the point of entry of the glass into the blast and increases to a substantially larger cross sectional area at a point spaced a substantial distance downstream from the entry of the glass into the blast where the fibers are in an attenuable state.

3. An apparatus for producing glass fibers which comprises means for producing a high temperature, high velocity gaseous blast, means for introducing a body of glass into the blast in a form in which it can be attenuated into fibers by the heat and velocity of the blast, and an enclosing duct for the blast and fibers entrained therein, said duct being connected to the means for producing the gaseous blast so as to exclude the atmosphere from the blast and extending from the blast means in the direction of the blast for a distance along the blast equal at least to that distance through which the fibers are in an attenuable state within the blast, the cross sectional area of the enclosure being substantially constant along the initial portion of the enclosure extending from the point of entry of the glass into the blast and abruptly increasing to a substantially larger cross sectional area at a point spaced a substantial distance downstream from the entry of the glass into the blast, but at a point at which the fibers are in an attenuable state.

References Cited in the file of this patent

UNITED STATES PATENTS

| | | |
|---|---|---|
| 2,578,100 | Stalego | June 12, 1959 |
| 2,925,620 | Karlovitz et al. | Feb. 23, 1960 |

FOREIGN PATENTS

| | | |
|---|---|---|
| 524,749 | Belgium | Dec. 31, 1953 |
| 610,845 | Great Britain | Oct. 21, 1948 |